Patented Aug. 30, 1927.

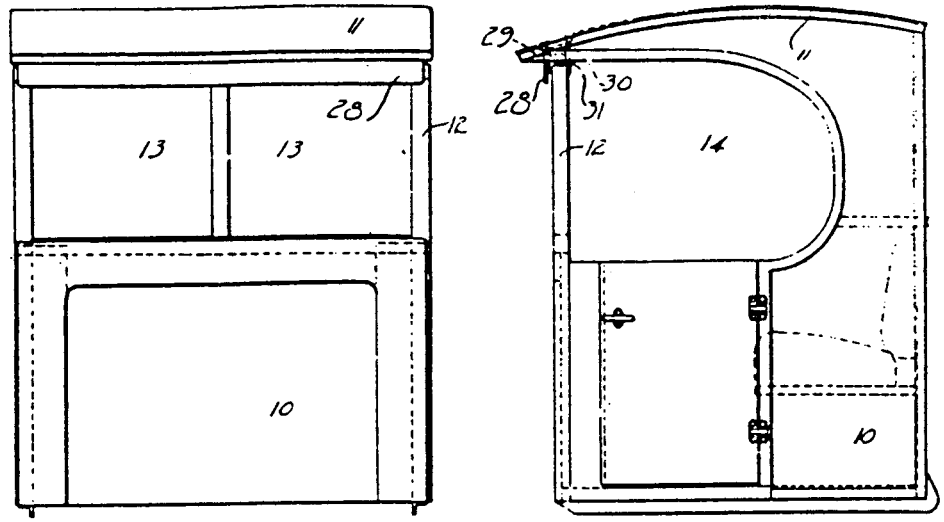
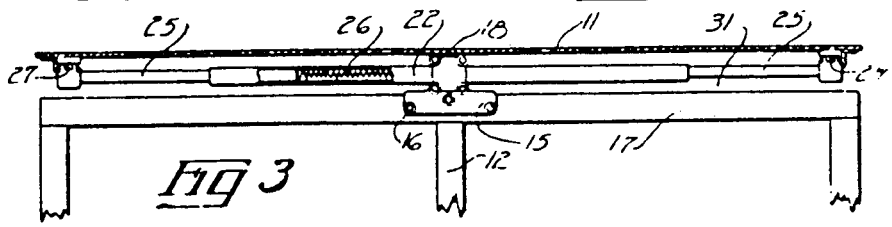
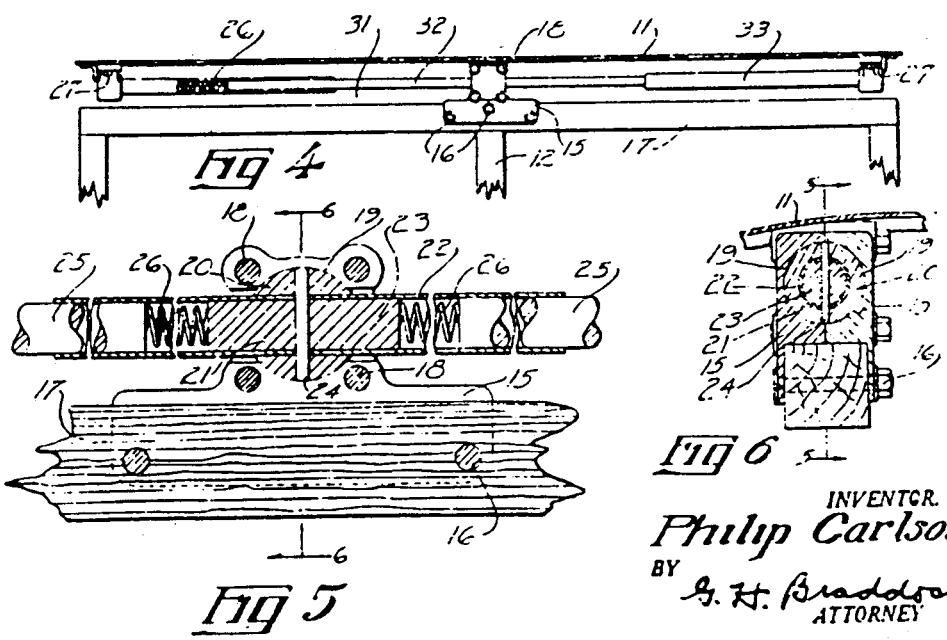

1,641,117

UNITED STATES PATENT OFFICE.

PHILIP CARLSON, OF BRIDGEPORT, CONNECTICUT.

CAB FOR MOTOR VEHICLES.

Application filed January 21, 1927. Serial No. 162,630.

This invention relates to a cab for a truck or the like, and an object of the invention is to provide a cab having a novel and improved assembly of cab roof and top with wind shield structure.

An ordinary truck cab of commerce includes a cab roof or top rigidly associated with a wind shield structure, both the roof or top and wind shield structure being an integral part of a cab frame rigidly supported upon the chassis frame of a vehicle, which chassis frame is subjected to considerable weaving or warping under heavy loads and over rough ground, as is well known. Naturally, the twisting movement to which the chassis frame is subjected is communicated through the cab frame to the cab roof or top and wind shield structure to cause said roof or top and structure to have severe twisting strains relatively to each other, such strains having tendency to cause the cab roof or top, as well as the wind shield structure and the wind shield, to be broken or otherwise harmed.

A more specific object of the invention is to provide a cab having roof or top and wind shield structure which are rigidly supported upon the cab frame, and are resiliently connected to each other, whereby twisting or weaving strains communicated to said cab roof or top are not transmitted to said wind shield structure, and vice versa.

A further specific object is to provide a cab having resiliently connected roof or top and wind shield structure as stated, and also having a device designed to effect a permanent and dependable closure between said cab roof or top and said wind shield structure.

A further specific object is to provide simple, novel and improved mechanism for resiliently connecting a cab roof or top and wind shield structure, both rigidly supported upon a cab frame, which mechanism will be adapted to preclude the possibility of twisting or weaving strains communicated to said cab roof or top being transmitted to said wind shield structure, and vice versa.

A further specific object is to incorporate in said mechanism for resiliently connecting a cab roof or top and wind shield structure, practical and dependable features and characteristics of construction designed to render the cab an improvement generally over cabs heretofore known.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in on way in a limiting sense, changes in details of construction and arrangement of parts being permissible so long as within the spirit of the invention and the scope of the appended claims.

In the accompanying drawing forming a part of this specification,

Fig. 1 is a front elevational view of a cab for trucks having the features of the invention;

Fig. 2 is a side elevational view of the cab;

Fig. 3 is an enlarged fragmentary transverse sectional view, partially in elevation, detailing features of the mechanism for resiliently connecting the cab roof or top and wind shield structure;

Fig. 4 is a view corresponding with the showing of Fig. 3, disclosing modified features of the mechanism for resiliently connecting the cab roof or top and wind shield structure;

Fig. 5 is a fragmentary sectional view partially in elevation, the scale being larger than in Fig. 3, on line 5—5 in Fig. 6, detailing the ball joint connection between the cab roof or top and wind shield structure and portions of the telescoping members and coil springs or equalizing devices associated with said telescoping members at either side of said ball joint connection; and Fig. 6 is a sectional view on line 6—6 in Fig. 5.

With respect to Figs. 1, 2, 3, 5 and 6 of the drawing and the numerals of reference thereon, 10 denotes a cab frame having a roof or top 11 and a wind shield structure 12 with wind shields 13. The forward portion of the cab roof or top extends approximately horizontally forwardly across the upper portion of the vertical wind shield structure 12, in spaced relation to said wind shield structure. 14 are the usual openings in the frame beneath the forward portion of the cab top and at the rear of the wind shield structure.

The upper end of the wind shield structure 12 terminates, as disclosed, in a horizontal surface, and the portion of the cab roof or top directly above said wind shield structure is also horizontal.

Oppositely disposed clamping members, represented 15, secured as at 16 upon the front and rear faces of the upper transverse member 17 of the wind shield structure and secured to each other as at 18, are provided with complemental hemi-spherical seats 19 for a ball 20. Desirably, the spherical seat for the ball 20 is situated at the midlength of the transverse member 17. See Figs. 3, 5 and 6.

The ball 20 has a transversely disposed opening 21 snugly receiving a tubular member 22. Numeral 23 represents a cylindrical block fitting within the portion of the tubular member 22 at the location of the ball 20, and 24 designates a pin extending across the diameter of the ball 20 and passing through the tubular member 22 and the block 23 to securely fasten said tubular member and said block to each other and to the ball 20. See Figs. 5 and 6.

Numeral 25 represents rods telescopingly situated in the opposite ends of the tubular member 22 and extending transversely of the frame, and 26 indicates coil springs within the tubular member 22, one between each rod 25 and the cylindrical block 23. The outer ends of the rods 25 are secured in any suitable manner as at 27 to the side portions of the cab roof or top 11. See Figs. 3 and 5.

Numeral 28 represents a suitable closure strip secured as at 29 to a cross-strip 30 of the cab roof or top and covering the opening 31 between the cab roof or top and wind shield structure. See Figs. 1, 2 and 3.

The cab frame 10 is adapted to be rigidly supported upon the chassis frame of a vehicle. When the vehicle is subjected to weaving or warping, as when under heavy loads, or on rough ground, twisting movements communicated through the cab frame to the roof or top cannot be imparted to the wind shield structure and twisting movements communicated through said frame to said wind shield structure cannot be imparted to said roof or top, it being evident that sidewise and twisting movements of the roof or top 11 relatively to the wind shield structure 12 will merely cause the universal joint between the cab roof or top and the wind shield structure, at the midwidth of the cab, to come into play and a coil spring or equalizing device 26 to become compressed. That is to say, when the vehicle is subjected to weaving or warping, the ball joint connection allows universal movement of the telescoping members relatively to the cab roof or top and the wind shield structure to care for the twisting movements of said roof or top and wind shield structure relatively to each other, while the coil springs or equalizing devices allow for the relative sidewise movements of said roof or top and structure. At the same time, the ball joint connection locates the central portions of the wind shield structure and the connecting mechanism between said structure and the cab roof or top in fixed relation to each other, and the telescoping members of said connecting mechanism comprise yieldable means resisting strains tending to move said cab roof or top and said wind shield structure directly toward or away from each other.

It should be remarked that the coil springs or equalizing devices 26 are placed under some compression when installed in the telescoping members to have considerable tendency toward returning the cab roof or top and wind shield structure to intended relation with respect to each other at the completion of a twisting or straining movement, as will be understood.

During all of the weaving and twisting of the roof or top and the wind shield structure relatively to each other, the closure strip 28 effectively covers the opening 31 between said roof or top and said wind shield structure. Said closure strip offers no interference to the movements of the cab roof or top and wind shield structure relatively to each other, for the reason that the distending part of said closure strip is wholly in front of the wind shield structure. See Fig. 2.

The disclosure of Fig. 4 is about the same as in the other figures, but several of the parts are reversed. Parts the same as in the other figures are correspondingly numbered. Numeral 32 represents a rod secured in the ball 20 and substituted at this location for the tubular member 22 and the block 23, and 33 represents tubular members which telescope upon the ends of the rod 32 in about the same manner as before. Coil springs 26 between the rod 32 and the closed outer ends of the tubular members 33 function in the manner as already stated, and said outer ends of the members 33 are secured upon the side portions of the cab roof or top as at 27.

What I claim is:

1. A cab comprising a cab frame including a roof member, a wind shield structure member upon said frame and beneath said roof member, said members being rigid with the frame, and a resilient connection between said members to preclude the transmission to said wind shield structure of twisting strains imparted to said roof, and vice versa, said resilient connection including a universal joint fixed relatively to one of said members, a telescoping element fixed to said joint, a cooperating telescoping element fixed to the other of said members, and a yieldable equalizing device associated with said telescoping elements to urge said elements apart.

2. A cab comprising a cab frame including a roof member, a wind shield structure member upon said frame and beneath said roof member, said members being rigid with the frame, and a resilient connection between said members including a universal joint fixed relatively to one of the members, a telescoping element at each side of said joint and fixed thereto, a cooperating telescoping element for each of the telescoping elements first mentioned fixed to the other of said members, and a yieldable equalizing device associated with each set of telescoping elements to urge said telescoping elements of a set apart.

3. A cab comprising a cab frame including a roof member, a wind shield structure member upon said frame and beneath said roof member, said members being rigid with the frame, and a resilient connection between said members including a universal joint at the midwidth of the cab and fixed relatively to one of the members, a telescoping element at each side of said joint and fixed thereto, a cooperating telescoping element for each of the telescoping elements first mentioned fixed to the other of said members adjacent a side of said cab, and a yieldable equalizing device associated with each set of telescoping elements.

4. A cab comprising a cab frame adapted to be positioned upon the chassis frame of a vehicle, the cab frame including an integral top member, a wind shield structure member integral with said cab frame and beneath said top member, and a resilient connection between said top member and wind shield structure member including a universal joint fixed relatively to one of said members, a telescoping element at each side of said joint and fixed thereto, a cooperating telescoping element for each of the telescoping elements first mentioned fixed to the other of said members, and a yieldable equalizing device between the telescoping elements of each set.

5. A cab comprising a cab frame adapted to be positioned upon the chassis frame of a vehicle, the cab frame including an integral top member, a wind shield structure member integral with said cab frame and beneath said top member, and a resilient connection between said top member and wind shield structure member including a universal joint fixed relatively to one of said members, a distensible and contractible device at each side of said joint fixed at one end to said joint and at opposite end to the other of said members, and a yieldable equalizing device associated with each distensible and contractible device.

6. A cab comprising a cab frame adapted to be positioned upon the chassis frame of a vehicle, the cab frame including an integral top member, a wind shield structure member integral with said cab frame and beneath said top member, and a resilient connection between said top member and wind shield structure member including a universal joint fixed relatively to one of said members, a distensible and contractible device at each side of said joint fixed to said joint and to the other of said members, and a yieldable equalizing device associated with each distensible and contractible device tending to urge said distensible and contractible devices toward distended position.

7. A cab comprising a cab frame adapted to be positioned upon the chassis frame of a vehicle, the cab frame including an integral top member, a wind shield structure member integral with said cab frame and beneath said top member, and a resilient connection between said top member and wind shield structure member including a universal joint fixed relatively to one of said members at the midwidth of said cab, a distensible and contractible device at each side of said joint fixed to said joint and to the other of said members, and a yieldable equalizing device associated with each distensible and contractible device.

8. A cab comprising a cab frame adapted to be positioned upon the chassis frame of a vehicle, the cab frame including an integral top member, a wind shield structure member integral with said cab frame and beneath said top member, and a resilient connection between said top member and wind shield structure member including a universal joint fixed relatively to one of said members at the midwidth of said cab, a distensible and contractible telescoping device at each side of said joint fixed to said joint and to the other of said members, and a coil spring associated with each distensible and contractible telescoping device tending to urge said telescoping devices toward distended position.

9. A cab comprising a cab frame adapted to be positioned upon the chassis frame of a vehicle, the cab frame including a rigid, integral, forwardly extending top member, a rigid wind shield structure member integral with said cab frame and beneath said top member, the wind shield structure member and cab top member being in proximity to each other, and a resilient connection between said top member and wind shield structure member including a universal joint fixed relatively to one of said members at the midwidth of said cab, a distensible and contractible device at each side of said joint and secured to said joint and the other of said members, and a coil spring associated with each distensible and contractible device tending to urge said devices toward distended position.

10. A cab comprising a cab frame adapted to be positioned upon the chassis frame of a vehicle, the cab frame including a rigid, integral, forwardly extending top member, and a rigid wind shield structure member integral with said cab frame and beneath said top member, the wind shield structure member and cab top member being in proximity to each other, there being an opening between said members, a resilient connection between said members including a universal joint fixed relatively to one of said members at the midwidth of said cab, a distensible and contractible device at each side of said joint and secured to said joint and the other of said members, coil springs tending to urge said distensible and contractible devices toward distended position, and a closure strip covering said opening.

Signed at Bridgeport, in the county of Fairfield, and State of Connecticut, this 16th day of December, A. D., 1926.

PHILIP CARLSON.